US011097383B2

(12) United States Patent
Arnold

(10) Patent No.: US 11,097,383 B2
(45) Date of Patent: Aug. 24, 2021

(54) ALIGNMENT OF FRAME MEMBERS IN WELDED ASSEMBLIES

(71) Applicant: Caterpillar Inc., Deerfield, IL (US)

(72) Inventor: Chad Arnold, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 256 days.

(21) Appl. No.: 16/180,794

(22) Filed: Nov. 5, 2018

(65) Prior Publication Data
US 2020/0139492 A1 May 7, 2020

(51) Int. Cl.
B23K 37/053 (2006.01)
B23K 101/24 (2006.01)

(52) U.S. Cl.
CPC ........ B23K 37/053 (2013.01); B23K 2101/24 (2018.08)

(58) Field of Classification Search
CPC ... B23K 37/053; B23K 37/0531; B25B 11/02; F16B 9/09; F16B 9/056; F16B 9/01
See application file for complete search history.

(56) References Cited

U.S. PATENT DOCUMENTS

| | | | |
|---|---|---|---|
| 2,614,827 A | 10/1952 | Peach et al. | |
| 3,211,481 A | 10/1965 | Cadovius | |
| 4,153,281 A * | 5/1979 | Ahlstone | F16L 27/06 277/609 |
| 4,238,117 A * | 12/1980 | Newman | B23K 33/006 256/65.1 |
| 4,381,871 A * | 5/1983 | Dopyera | F16L 27/053 285/261 |
| 4,406,474 A | 9/1983 | Scharf | |
| 4,952,092 A * | 8/1990 | Ballerstein | F16B 7/0453 403/174 |
| 5,404,682 A * | 4/1995 | West | A47G 29/1216 248/183.1 |
| 7,302,907 B2 * | 12/2007 | Carlton | B63B 34/60 114/364 |
| 2015/0285418 A1 * | 10/2015 | Rempert | F16L 41/18 285/363 |

FOREIGN PATENT DOCUMENTS

| | | |
|---|---|---|
| FR | 2638793 A1 | 5/1990 |
| JP | 5081325 B1 | 11/2012 |

OTHER PUBLICATIONS

International Search Report and Written Opinion for International Application No. PCT/US2019/057367 dated Feb. 10, 2020 (11 pages).

* cited by examiner

Primary Examiner — Tyrone V Hall, Jr.
Assistant Examiner — Makena S Markman
(74) Attorney, Agent, or Firm — Harrity & Harrity LLP

(57) ABSTRACT

A system for improving alignment in welded assemblies is provided. The system includes a support member having a surface and a projection extending from the surface. The projection may include one of a convex or a concave geometry. The system includes a positioning member provided over the support member for receiving a frame member. The positioning member may be movable over the support member, and the positioning member may include a geometry configured to engage the one of the convex or the concave geometry. The frame member may be movable from a first position relative to a center of the projection to a second position relative to the center of the projection during movement of the positioning member over the support member.

20 Claims, 3 Drawing Sheets

ALIGNMENT OF FRAME MEMBERS IN WELDED ASSEMBLIES

TECHNICAL FIELD

The present disclosure relates generally to improving alignment in welded assemblies and, more particularly, to improving alignment of frame members in welded assemblies.

BACKGROUND

Frame members may be welded to form assemblies for use in various structures, such as vehicle frames, machine frames, building frames, and/or the like. Multiple frame members may be welded to a same support member, which forms a node or a hub of a welded assembly. In general, a tubular frame member is inserted into a counterbored section of a support member and welded in place. However, angular repositioning of the tubular frame member, prior to welding, may be desired based on tolerance differences existing between the tubular frame member and the counterbored section of the support member. Additionally, when one end of a tubular frame member is rigidly welded to one support member, repositioning of an opposite end of the tubular frame member, relative to a counterbored section of an opposite support member, may be desired based on an angle at which the tubular frame member extends from the one support member. The inability to angularly position tubular frame members relative to a support member may, upon welding of the tubular frame members, result in a welded assembly having improper alignment and/or imbalances.

One attempt at improving a frame work assembly is disclosed in U.S. Pat. No. 3,211,481, (hereinafter, "the '481 patent"). Per the '481 patent, a frame work comprising tubular elements and devices having at least one spigot, pin, or the like over which a tubular element can be slid in a spigot and socket fashion is disclosed.

While the method disclosed by the '481 utility model addresses one method of improving a frame work assembly by way of sliding tubular elements in a spigot and socket fashion, a need exists for more precise and/or effective control over the angular positioning of tubular frame members prior to forming a welded assembly and/or overcoming other problems in the art.

SUMMARY

According to some implementations, the present disclosure is related to a system for improving alignment in welded assemblies. The system may include a support member having a surface and a projection extending from the surface, the projection may include one of a convex or a concave geometry. The system may include a positioning member positioned over the support member configured to receive a frame member, the positioning member may be movable over the support member, and the positioning member may include a geometry configured to engage the one of the convex or the concave geometry. In some implementations, the frame member may be movable from a first position relative to a center of the projection to a second position relative to the center of the projection during movement of the positioning member over the support member.

According to some implementations, the present disclosure is related to an additional system for improving alignment in welded assemblies. The system may include a support member having a surface and a projection extending from the surface, the projection may include one of a convex or a concave geometry. The system may include a positioning member positioned over the support member, the positioning member may be movable over the support member, and the positioning member may include a geometry configured to engage the one of the convex or the concave geometry. The system may include a frame member attached to the positioning member, the frame member may extend along an elongate axis. In some implementations, the frame member may be movable from a first position relative to the surface of the support member to a second position relative to the surface of the support member during movement of the positioning member over the support member. In some implementations, when the frame member is in the first position, the elongate axis is disposed at a first angle relative to the surface and, when the frame member is in the second position, the frame member is disposed at a second angle relative to the surface, the second angle may be different than the first angle.

According to some implementations, the present disclosure is related to an assembly. The assembly may include a support member having a first projection and a second projection, a first positioning member may be disposed over the first projection, and the first positioning member may be movable relative to the first projection. The assembly may include a second positioning member disposed over the second projection, and the second positioning member may be movable relative to the second projection. The assembly may include a first frame member attached to the first positioning member and a second frame member attached to the second positioning member. In some implementations, the first frame member may be movable in a first plurality of positions relative to a center of the support member when the first positioning member moves relative to the first projection, and the second frame member may be movable in a second plurality of positions relative to the center of the support member when the second positioning member moves relative to the second projection.

DETAILED DESCRIPTION

The instant disclosure relates to improving alignment in welded assemblies, in some implementations, by way of allowing for the angular displacement of one or more frame members relative to a support member, prior to the frame members being welded respective to the support member. In this way, the positioning and alignment of the frame members may be optimized prior to welding the frame members in a fixed position.

Figure 1:
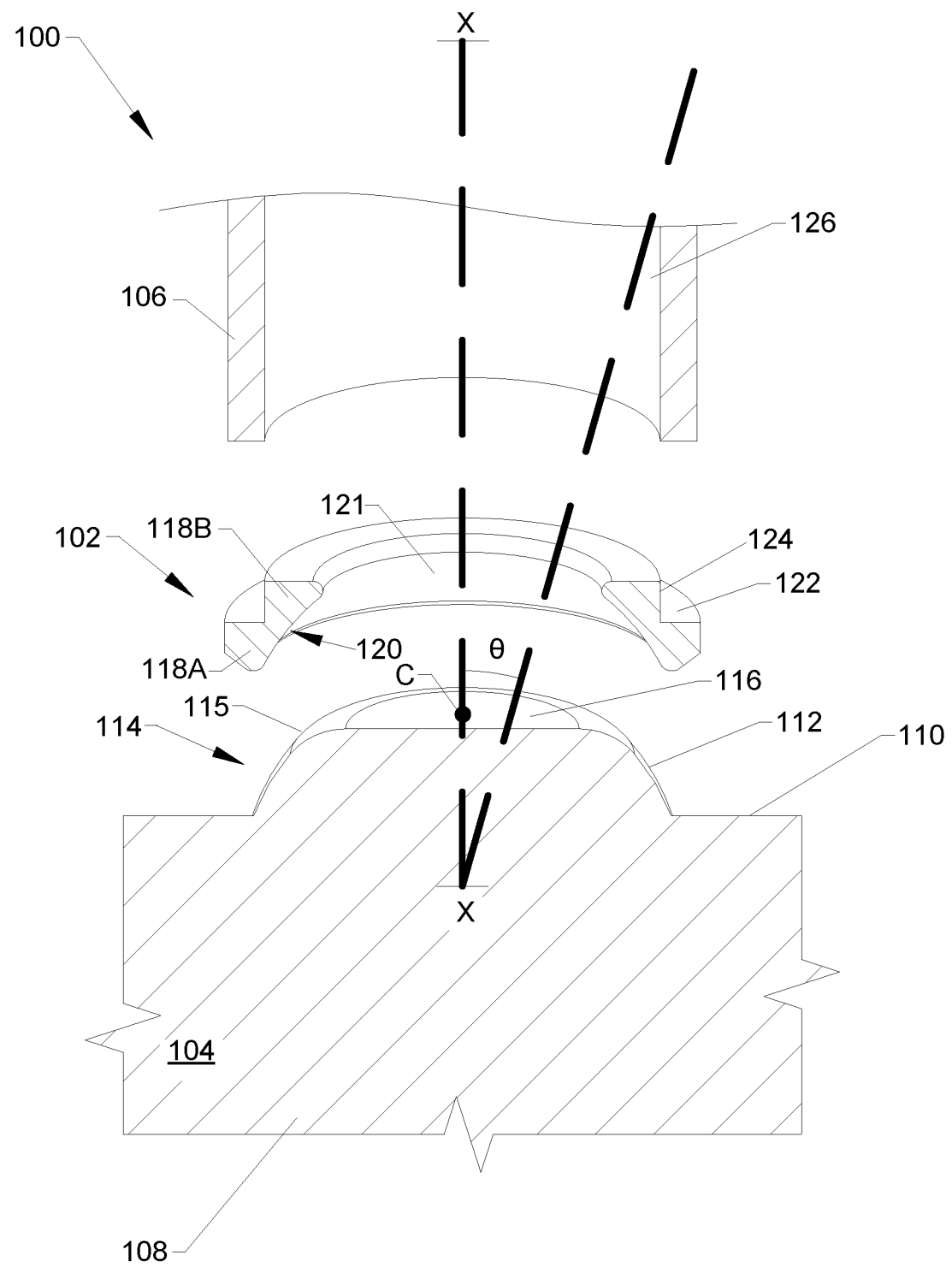
FIG. 1 is a diagram of an exploded view of an example system and device for improving alignment in a welded assembly.

Turning now to FIG. 1, a diagram of an exploded view of an example system, generally designated 100, and a device for improving alignment in a welded assembly is provided. In some implementations, the device for improving alignment in the welded assembly may include a positioning member 102 as described herein. System 100 may include positioning member 102 disposed between a support member 104 and a frame member 106. In some implementations, positioning member 102 may include an annular positioning ring by which frame member 106 may be spaced apart from and/or moved relative to support member 104, so that frame member 106 may be provided in a desired position and/or angle θ relative to support member 104, prior to welding, as described herein.

Referring to FIG. 1, and in some implementations, support member 104 may include a body 108 of material. In some implementations, body 108 may include a solid body of material being formed from a metal or a metal alloy. Body 108 may be formed by way of casting, forging, extruding, machining, and/or the like, and may be formed in any shape configured to support one or more positioning members 102 and/or one or more frame members 106 attached to the one or more positioning members 102. Support members 104 formed from non-solid bodies of material and/or non-metallic bodies of material are also contemplated herein. In some implementations, support member 104 may be devoid of one or more counterbores for receiving frame members 106 directly. In this way, frame members 106 may be movably displaced relative to support member 104 to optimize alignment and/or placement of the frame members 106 prior to being welded in a welded assembly. In some implementations, frame members 106 may include tubular frame members (e.g., tubes), such as tubular vehicle frame members, tubular building frame members, and/or the like.

In some implementations, support member 104 may include a surface 110 (e.g., an outer surface, an exterior surface, and/or the like) and at least one projection 112 extending from surface 110. In some implementations, projection 112 may include a geometry 114 or profile over which positioning member 102 may move by way of swiveling, gliding, sliding, rotating, tilting, pivoting, and/or the like. In some implementations, geometry 114 of projection 112 may include one of a concave or a convex geometry, having a rounded and/or partially spherical surface or wall. In some implementations, the rounded surface or wall of geometry 114 may terminate proximate an upper surface 116. In some implementations, upper surface 116 may include a substantially flat or planar surface, which may be configured to limit an amount by which positioning member 102 may swivel, slide, or otherwise move, relative to projection 112.

In some implementations, positioning member 102 may include at least a first body portion 118A and a second body portion 118B to which frame member 106 may couple via welding, brazing, swaging, crimping, and/or the like. As an example, frame member 106 may be welded to positioning member 102 and positioning member 102 may, in turn, be welded to support member 104 for forming a welded assembly as described herein. As a specific example, frame member 106 may be welded to positioning member 102 by way of a fillet welding method, and positioning member 102 may be welded to support member 104 by way of a final, robotic welding method. Positioning member 102 and/or frame member 106 may each be formed from a metal or metallic material, a metal alloy material, a non-metal material, and/or the like. Positioning member 102, support member 104, and frame member 106 may be formed from a same material (e.g., a same metal material, a same metal alloy, and/or the like) or different materials, where desired.

In some implementations, positioning member 102 may be configured to position (e.g., angle, angularly position, and/or the like) frame member 106 relative to support member 104, and may be welded to support member 104 when frame member 106 is provided in a desired position relative to support member 104. In some implementations, the respective first and second body portions 118A and 118B of positioning member 102 may collectively form a geometry 120 that may be one of a convex or a concave geometry configured to engage geometry 114 of projection 112. As an example, geometry 120 may include a rounded, concave geometry 121 configured to engage convex geometry 115. In this way, positioning member 102 may move on, over, against, and/or otherwise relative to projection 112, for positioning frame member 106 at a desired angle θ relative to a center C of projection 112. In some implementations, center C of projection 112 may be disposed along a central axis X, which may correspond to a center of support member 104, such that projection 112 may be centered relative to support member 104. In some implementations, center C of projection 112 may be non-centered relative to support member 104. In some implementations, frame member 106 may be provided at any one of a plurality of different angles θ relative to center C and/or central axis X of projection 112, support member 104, and/or the like.

Still referring to FIG. 1, and in some implementations, positioning member 102 may include a seat or ledge 122 formed by or between first body portion 118A and second body portion 118B, over which frame member 106 may be disposed. In some implementations, positioning member 102 may additionally include an outer wall 124, around which an inner wall 126 of frame member 106 may be disposed. In this way, tedious tolerance matching between frame members and counterbores may be obviated.

In some implementations, concave geometry 121 may be configured in a shape that substantially conforms to convex geometry 115, so that positioning member 102 may swivel over portions of convex geometry 115 to assume a desired position relative to convex geometry 115. In this way, positioning member 102 may position frame member 106 at a desired angle θ relative to center C and/or central axis X of projection 112 and/or support member 104. In some implementations, concave geometry 121 substantially matches a geometry of convex geometry 115, so that concave geometry 121 may fittingly engage, oppose (e.g., face), and/or abut portions of convex geometry 115 during movement of concave geometry 121 relative to convex geometry 115. In some implementations, convex geometry 115 may be partially nested within concave geometry 121 for improving movement of positioning member 102 relative to support member 104. In some implementations, positioning member 102 may be welded to support member 104 when frame member 106 is provided in a desired position, for example, when frame member 106 is provided at a desired angle θ relative to projection 112 and/or support member 104.

FIG. 1 is provided as an example. Other examples may differ from what was described in connection with FIG. 1. In other words, system 100, the components shown as being included in system 100, and/or the arrangement of the components, are provided for illustrative purposes only.

Figure 2:
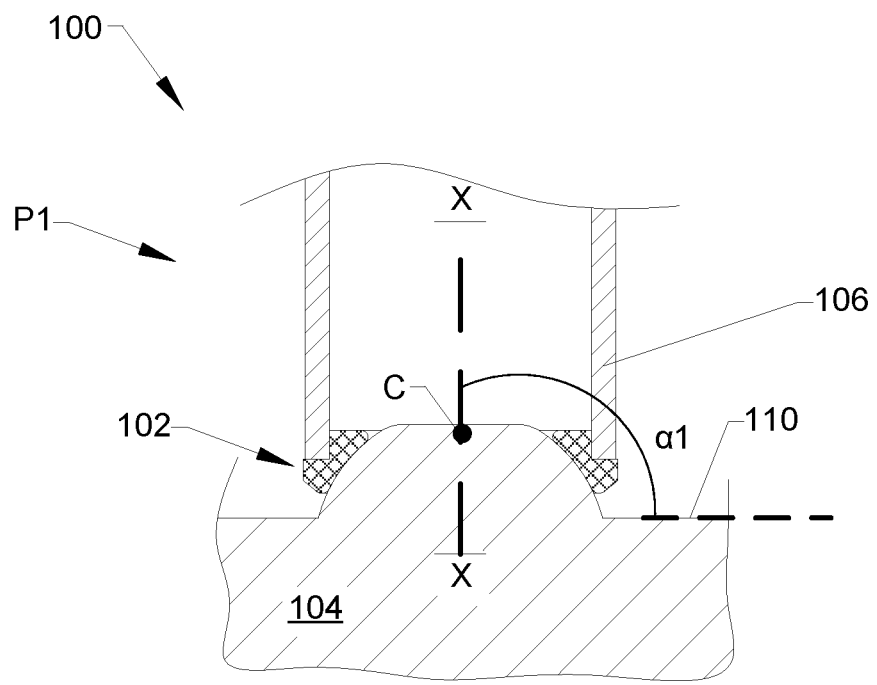
FIGS. 2 and 3 are diagrams of an assembled system and device for improving alignment in a welded assembly according to FIG. 1.
Figure 3:
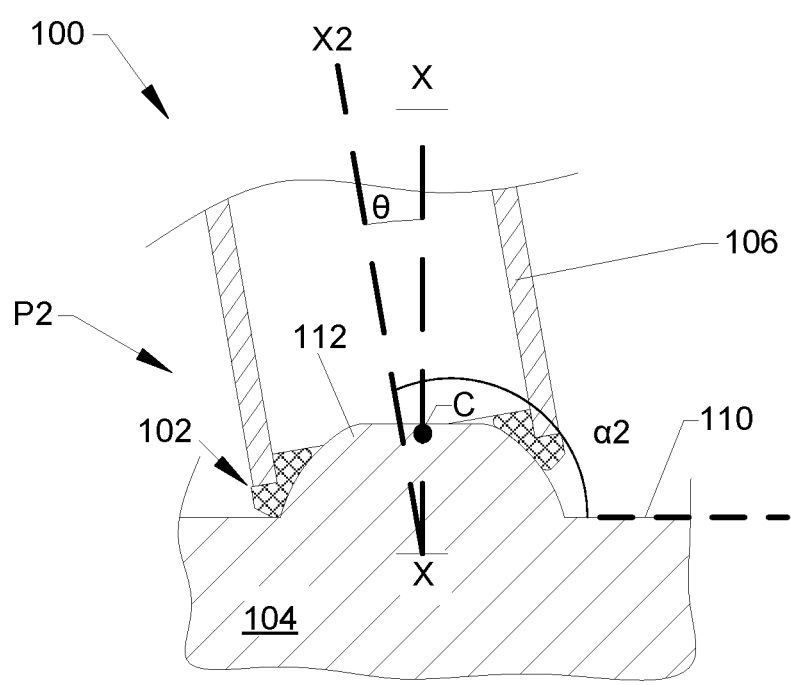

FIGS. 2 and 3 are diagrams of an assembled system 100 and device (e.g., positioning member 102) for improving alignment in a welded assembly according to FIG. 1. FIG. 2 illustrates positioning member 102 and frame member 106 being provided in a first position P1 relative to center C (e.g., and central axis X) of projection 112 and/or surface 110 of support member 104. FIG. 3 illustrates positioning member 102 and frame member 106 being provided in a second position P2 relative to center C (e.g., and central axis X) of projection 112 and/or surface 110 of support member 104. Positioning member 102 and frame member 106 may be provided in any number of positions relative to projection 112 and/or support member 104, as described herein. As described above, frame member 106 may be movable and, thus, positionable with respect to center C of projection 112 and/or surface 110 of support member 104, by way of moving positioning member 102 on, over, and/or against projection 112.

Referring to FIG. 2, and in some implementations, positioning member 102 and frame member 106 may be provided in first position P1, which may be coaxial, or substantially coaxial, with respect to projection 112 and/or support member 104. For example, in first position P1, positioning member 102 and frame member 106 may be centered with respect to central axis X, so that central axis X may correspond to a central axis of positioning member 102, support member 104, frame member 106, and/or projection 112. In some implementations, positioning member 102 may be welded to support member 104, so that frame member 106 may be maintained in first position P1 to form a welded assembly. As described herein, a welded assembly may include one or more support members 104, and each support member 104 may be connected (e.g., via welding, and/or the like) to one or more positioning members 102 and/or one or more frame members 106. Frame members 106 may be disposed in a plurality of different angles and/or positions relative to projection 112, support member 104, and/or portions thereof, as described herein.

Still referring to FIG. 2, and in some implementations, positioning member 102 and frame member 106 may be provided in first position P1, which may be disposed at a first angle $\alpha 1$ relative to surface 110 of support member 104. In some implementations, first angle $\alpha 1$ may include an angle between a center and/or a central axis (e.g., a central, elongate axis X2, FIG. 3) of frame member 106 and surface 110. First angle $\alpha 1$ may include an acute angle, a right angle, or an obtuse angle. In some implementations, first angle $\alpha 1$ may range from about 45° to about 135°, or any angle or subrange of angles therebetween. First angles $\alpha 1$ that are less than about 45° and/or greater than about 135° are also contemplated herein.

Turning now to FIG. 3, and in some implementations, positioning member 102 and frame member 106 may be provided in second position P2, which may be non-coaxial, non-centered, offset, and/or otherwise angled relative to center C of projection 112 and/or support member 104. For example, in second position P2, positioning member 102 and/or frame member 106 may be offset, by angle θ, from center C and central axis X of projection 112 and/or support member 104. In some implementations, frame member 106 includes a central, elongate axis X2 that may be offset by angle θ with respect to center C and/or central axis X of projection 112 and/or support member 104. In some implementations, angle θ may include an angle ranging from between about 1° and about 60°, or any angle or subrange of angles therebetween. Angles θ of greater than about 60° are also contemplated herein. In some implementations, positioning member 102 may be welded to support member 104 so that frame member 106 may be maintained in second position P2 upon formation of a welded assembly.

Still referring to FIG. 3, and in some implementations, positioning member 102 and frame member 106 may be provided in second position P2, which may be disposed at a second angle $\alpha 2$ relative to surface 110 of support member 104. In some implementations, second angle $\alpha 2$ may correspond to an angle between elongate axis X2 of frame member 106 and surface 110 of support member 104. Elongate axis X2 of frame member 106 can, but does not have to, correspond to a center of positioning member 102. In some implementations, second angle $\alpha 2$ may include an acute angle, a right angle, or an obtuse angle. In some implementations, second angle $\alpha 2$ may range from about 45° to about 135°, or any angle or subrange of angles therebetween. Second angles $\alpha 2$ that are less than about 45° and/or greater than about 135° are also contemplated herein. In some implementations, second angle $\alpha 2$ may be greater than first angle $\alpha 1$, or less than first angle $\alpha 1$.

FIGS. 2 and 3 are provided as examples. Other examples may differ from what was described in connection with FIGS. 2 and 3. In other words, the positioning of components shown in FIGS. 2 and 3 and/or the arrangement of the components shown in FIGS. 2 and 3 are provided for illustrative purposes only. Other positioning and/or arrangements of the components shown in FIGS. 2 and 3 are contemplated herein.

Figure 4:
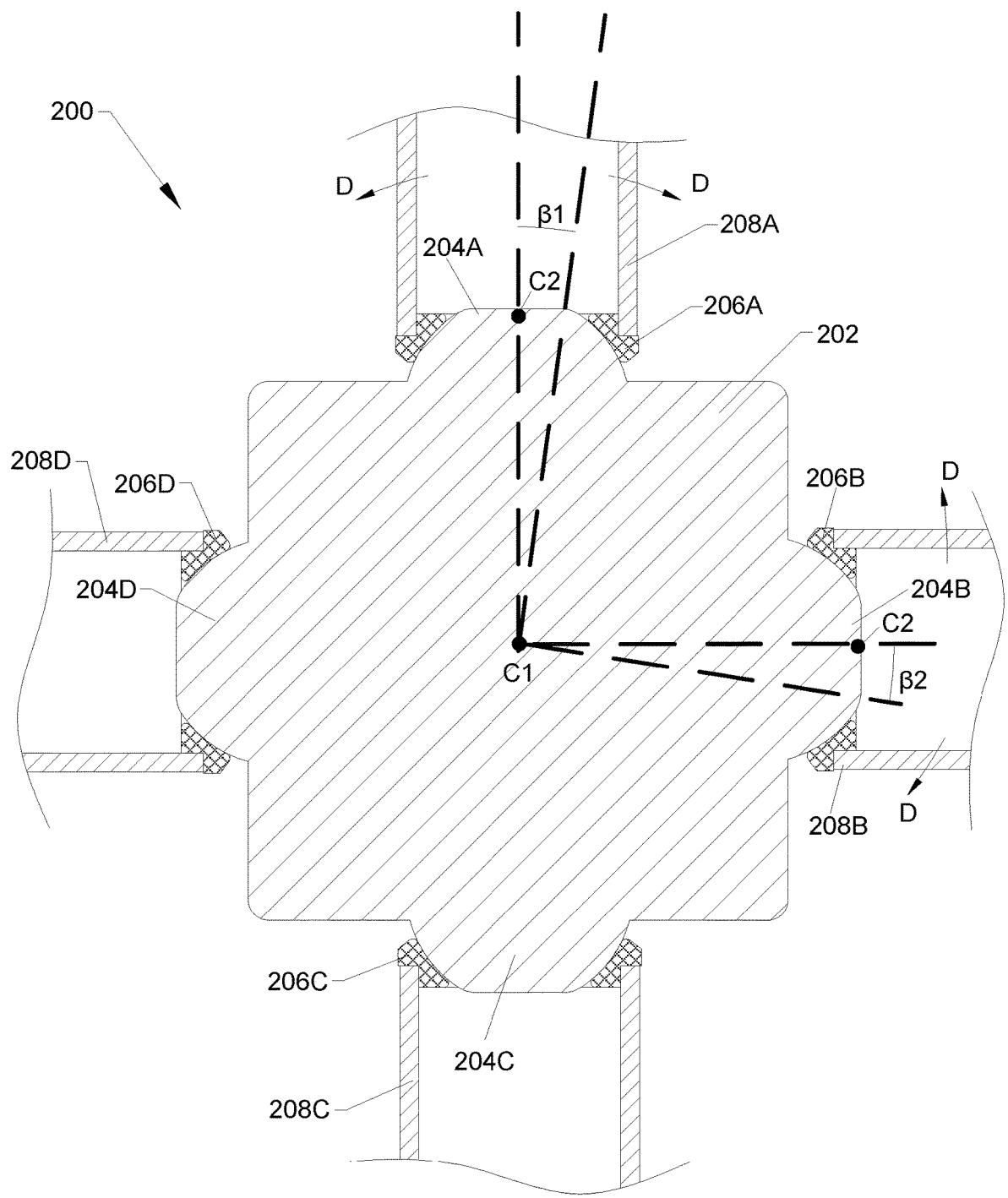
FIG. 4 is a sectional view of an assembly, a portion of which includes the system and device according to FIG. 1.

FIG. 4 is a sectional view of an assembly, generally designated 200, a portion of which may include the system and device according to FIG. 1. Assembly 200 may include a support member 202 and a plurality of projections (e.g., 204A-204D) extending from support member 202. Support member 202 may include a metallic body of material or a non-metallic body of material, which may be cast, extruded, machined, and/or the like. Support member 202 may include a symmetric body of material, which may be symmetric respective to a center C1 of support member 202, or a non-symmetric body of material, which may be devoid of a center C1. In some implementations, support member 202 may form a node or hub of a welded assembly, to which one or more positioning members (e.g., 206A-206D) may be attached (e.g., via welding and/or the like). One or more frame members (e.g., 208A-208D) may, in turn, be welded to the one or more positioning members (e.g., 206A-206D), in some cases, in advance of positioning the one or more positioning members (e.g., 206A-206D) relative to support member 202. In some implementations, center C1 of support member 202 can, but does not have to, correspond to centers C2 of the one or more projections. In this way, frame members (e.g., 208A-208D) may be angled respective to center C1 of support member and/or centers C2 of projections by way of moving the one or more positioning members (e.g., 206A-206D) relative to support member 202 and/or projections.

As FIG. 4 illustrates, and in some implementations, assembly 200 may include at least a first projection 204A, a second projection 204B, a third projection 204C, and a fourth projection 204D formed therein. More than four, or less than four, projections are contemplated. In some implementations, each projection may include a rounded, convex geometry over which at least one positioning member may be provided. The at least one positioning member may be attached to a respective frame member for positioning the respective frame member by way of moving on, over, and/or against a respective projection. In some implementations, the at least one positioning member may move the respective frame member by an angle (e.g., β1, β2, and/or the like), relative to center C1 of support member and/or center C2 of an underlying projection.

In some implementations, assembly 200 may additionally include at least a first positioning member 206A provided over first projection 204A, a second positioning member 206B provided over second projection 204B, a third positioning member 206C provided over third projection 204C, and a fourth positioning member 206D provided over fourth projection 204D. Similarly, assembly 200 may additionally include at least a first frame member 208A coupled (e.g., welded, tacked, swaged, and/or the like) to first positioning member 206A, a second frame member 208B coupled to second positioning member 206B, a third frame member 208C coupled to third positioning member 206C, and a fourth frame member 208D coupled to fourth positioning member 206D. More than four, or less than four, positioning members and/or frame members may be provided on or over support member 202. In some implementations, each positioning member (e.g., 206A-206D) may include a concave geometry or profile, configured to fittingly engage and/or move (e.g., slide, swivel, tilt, and/or the like) relative to an underlying projection (e.g., 204A-204D), as described herein.

Still referring to FIG. 4, and in some implementations, the frame members (e.g., 208A-208B) may be configured to move in one or more directions D during movement of a positioning member to which a frame member is attached. In this way, the frame members may be located at various angular positions respective to center C1 of support member 202 and/or center C2 of an underlying projection. For example, first frame member 208A may be movable in a first plurality of positions relative to center C1 of support member 202 and/or center C2 of first projection 204A, during movement of first positioning member 206A relative to first projection 204A. As a specific example, first frame member may be located at a first angle $\beta 1$ relative to center C1 of support member 202 and/or center C2 of first projection 204A during movement of first positioning member 206A relative to first projection 204A.

Similarly, second frame member 208B may be movable in a second plurality of positions relative to center C1 of support member 202 and/or center C2 of second projection 204B during movement of second positioning member 206B relative to second projection 204B. As an example, second frame member may be located at a second angle $\beta 2$ relative to center C1 of support member 202 and/or center C2 of second projection 204B during movement of second positioning member 206B relative to second projection 204B. Third frame member 208C and fourth frame member 208D may likewise be locatable relative to center C1 of support member 202 and/or centers of underlying projections as described herein. In this way, locations of the various frame members (e.g., 208A-208D) may be optimized prior to welding.

In some implementations, assembly 200 includes a plurality of adjacent projections (e.g., 204A-204D), a plurality of coaxial projections (e.g., first projection 204A is coaxial to third projection 204C, and/or the like), and/or a plurality of non-coaxial projections.

In some implementations, a method of providing assembly 200 may be provided. The method may include assembling one or more frame members, of a plurality of frame members (e.g., 204A-204D), to one or more positioning members, of a plurality of frame members (e.g., 206A-206D), and welding (e.g., fillet welding, tack welding, and/or the like) the one or more frame members to the one or more positioning members. As an example, and in some cases, individual frame members may be assembled and/or attached to a respective individual positioning member. The method of providing assembly 200 may additionally include moving the one or more frame members to a desired position relative to a center or surface of support member 202 by way of the one or more positioning members, and welding (e.g., fillet welding, tack welding, and/or the like) the respective positioning members to support member 202. A robotic welding machine may be used to weld the components (e.g., frame members, positioning rings, support member, etc.) of assembly 200 in a final position for forming a welded assembly. Multiple welded assemblies may likewise be welded together, where desired, to form a desired structure (e.g., a vehicle frame, and/or the like), as described herein.

FIG. 4 is provided as an example. Other examples may differ from what was described in connection with FIG. 4. In other words, assembly 200, the components shown as being included in assembly 200, and/or the location and/or arrangement of the components of assembly 200, are provided for illustrative purposes only.

INDUSTRIAL APPLICABILITY

The disclosed example system 100 and example assembly 200, which may include example system 100, may incorporate a plurality of frame members 106 that may be movable to any one of several different angular positions over a support member 104 in advance of welding the frame members 106 in an assembly. In this way, providing counterbores in support member 104 may be obviated. In this way, waste attributed to frame members 106 failing to satisfy specific tolerances may be prevented. Moreover, customizing the positions of frame members 106 by way of moving positioning members 102 over support member 104 may improve alignment in a welded assembly, and reduce distortions.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A system, comprising:
a support member including a surface and a projection extending from the surface, the projection having one of a convex geometry or a concave geometry; and
a positioning member positioned over the support member,
wherein the positioning member includes a seat or ledge configured for a frame member to be disposed over the seat or ledge,
wherein the positioning member is movable over the support member by way of one or more of swiveling, gliding, sliding, rotating, tilting, or pivoting,
wherein the positioning member has a geometry configured to engage the one of the convex geometry or the concave geometry,
wherein the frame member is directly welded, brazed, swaged, or crimped to the positioning member, and wherein the frame member is movable from a first position relative to a center of the projection to a second position relative to the center of the projection during movement of the positioning member over the support member.

2. The system of claim 1,
wherein the projection has the convex geometry, and
wherein the convex geometry is at least partially nested within the positioning member.

3. The system of claim 1, wherein an inner wall of the frame member is disposed around an outer wall of the positioning member.

4. The system of claim 1, wherein the frame member comprises a tube.

5. The system of claim 1,
wherein the support member comprises a plurality of projections extending from the surface, and
wherein the plurality of projections include the projection.

6. The system of claim 5, further comprising:
a plurality of positioning members disposed over the plurality of projections; and
a plurality of frame members attached to the plurality of positioning members,
wherein a first positioning member, of the plurality of positioning members, is configured to position a first frame member, of the plurality of frame members, at a first angle relative to the surface of the support member,
wherein the positioning member is the first positioning member,
wherein the frame member is the first frame member,
wherein a second positioning member, of the plurality of positioning members, is configured to position a second frame member, of the plurality of frame members, at a second angle relative to the surface of the support member, and
wherein the first angle is different than the second angle.

7. The system of claim 1, wherein an inner wall of the frame member is disposed around an outer wall of the positioning member.

8. A system, comprising:
a support member including a surface and a projection extending from the surface, the projection having one of a convex geometry or a concave geometry;
a positioning member positioned over the support member,
wherein the positioning member is movable over the support member by way of one or more of swiveling, gliding, sliding, rotating, tilting, or pivoting, and
wherein the positioning member has a geometry configured to engage the one of the convex geometry or the concave geometry; and
a frame member attached to the positioning member,
wherein the positioning member includes a seat or ledge configured for the frame member to be disposed over the seat or ledge,
wherein the frame member extends along an elongate axis,
wherein the frame member is movable from a first position relative to the surface of the support member to a second position relative to the surface of the support member during movement of the positioning member over the support member,
wherein, when the frame member is in the first position, the elongate axis is disposed at a first angle relative to the surface, wherein the frame member is directly welded, brazed, swaged, or crimped to the positioning member, and
wherein, when the frame member is in the second position, the frame member is disposed at a second angle relative to the surface, the second angle being different than the first angle.

9. The system of claim 8,
wherein the projection has the convex geometry, and
wherein the convex geometry is at least partially nested within the positioning member.

10. The system of claim 8, wherein the frame member is disposed around the positioning member.

11. The system of claim 8, wherein the frame member is spaced apart from the support member by the positioning member.

12. The system of claim 8, wherein the frame member comprises a tube.

13. The system of claim 8,
wherein the support member comprises a plurality of projections extending from the surface,
wherein the plurality of projections include the projection,
wherein the plurality of projections are configured to engage a plurality of positioning members, and
wherein the plurality of positioning members include the positioning member.

14. An assembly comprising:
a support member comprising a first projection and a second projection;
a first positioning member disposed over the first projection,
wherein the first positioning member is movable relative to the first projection by way of one or more of swiveling, gliding, sliding, rotating, tilting, or pivoting;
a second positioning member disposed over the second projection,
wherein the second positioning member is movable relative to the second projection;
a first frame member attached to the first positioning member; and
a second frame member attached to the second positioning member,
wherein the first positioning member includes a seat or ledge configured for the first frame member to be disposed over the seat or ledge,
wherein the first frame member is movable in a first plurality of positions relative to a center of the support member when the first positioning member moves relative to the first projection, and
wherein the second frame member is movable in a second plurality of positions relative to the center of the support member when the second positioning member moves relative to the second projection.

15. The assembly of claim 14, wherein:
the first projection comprises a first convex geometry;
the first positioning member comprises a first concave geometry configured to engage the first convex geometry;
the second projection comprises a second convex geometry; and
the second positioning member comprises a second concave geometry configured to engage the second convex geometry.

16. The assembly of claim 14, wherein the first positioning member and the second positioning member are weldable to the support member.

17. The assembly of claim 14, wherein:
the first frame member is welded to the first positioning member; and
the second frame member is welded to the second positioning member.

18. The assembly of claim 14, wherein the first projection is adjacent to the second projection.

19. The assembly of claim 14, wherein the first projection and the second projection are coaxial.

20. The assembly of claim 14, wherein an inner wall of the first frame member is disposed around an outer wall of the first positioning member.

* * * * *